United States Patent [19]

Ecker

[11] 4,308,723
[45] Jan. 5, 1982

[54] HEAT PUMP EMPLOYING OPTIMAL REFRIGERANT COMPRESSOR FOR LOW PRESSURE RATIO APPLICATIONS

[75] Inventor: Amir L. Ecker, Dallas, Tex.

[73] Assignee: Atlantic Richfield Company, Los Angeles, Calif.

[21] Appl. No.: 50,548

[22] Filed: Jun. 21, 1979

[51] Int. Cl.$^3$ ............................................. F25B 27/00
[52] U.S. Cl. ................................ 62/235.1; 62/238.6; 62/324.6
[58] Field of Search ................. 62/2, 324 D, 238 E, 62/510, 324 A; 237/2 B

[56] References Cited

U.S. PATENT DOCUMENTS

| | | | |
|---|---|---|---|
| 1,969,187 | 8/1934 | Schutt | 237/2 B X |
| 4,030,312 | 6/1977 | Wallin et al. | 62/324 D X |
| 4,062,489 | 12/1977 | Henderson | 62/2 X |
| 4,086,072 | 4/1978 | Shaw | 62/510 X |
| 4,089,667 | 5/1978 | Jonsson | 62/238 E |
| 4,100,763 | 7/1978 | Brody | 62/2 X |
| 4,137,726 | 2/1979 | Watanda | 62/324 A X |
| 4,165,037 | 8/1979 | McCarson | 62/2 X |
| 4,196,595 | 4/1980 | Shaw | 237/2 B X |

Primary Examiner—William E. Tapolcai, Jr.
Attorney, Agent, or Firm—James C. Fails

[57] ABSTRACT

What is disclosed is a heat pump apparatus for conditioning a fluid characterized by a fluid handler for circulating the fluid in heat exchange relationship with a refrigerant fluid; two refrigerant heat exchangers; one for effecting the heat exchange with the fluid and a second refrigerant-heat exchange fluid heat exchanger for effecting a low pressure ratio of compression of the refrigerant; a rotary compressor for compressing the refrigerant with low power consumption at the low pressure ratio; at least one throttling valve connecting at the inlet side of heat exchanger in which liquid refrigerant is vaporized; a refrigerant circuit serially connecting the above elements; refrigerant in the circuit; a source of heat exchange fluid; heat exchange fluid circulating device and heat exchange fluid circuit for circulating the heat exchange fluid in heat exchange relationship with the refrigerant.

22 Claims, 10 Drawing Figures

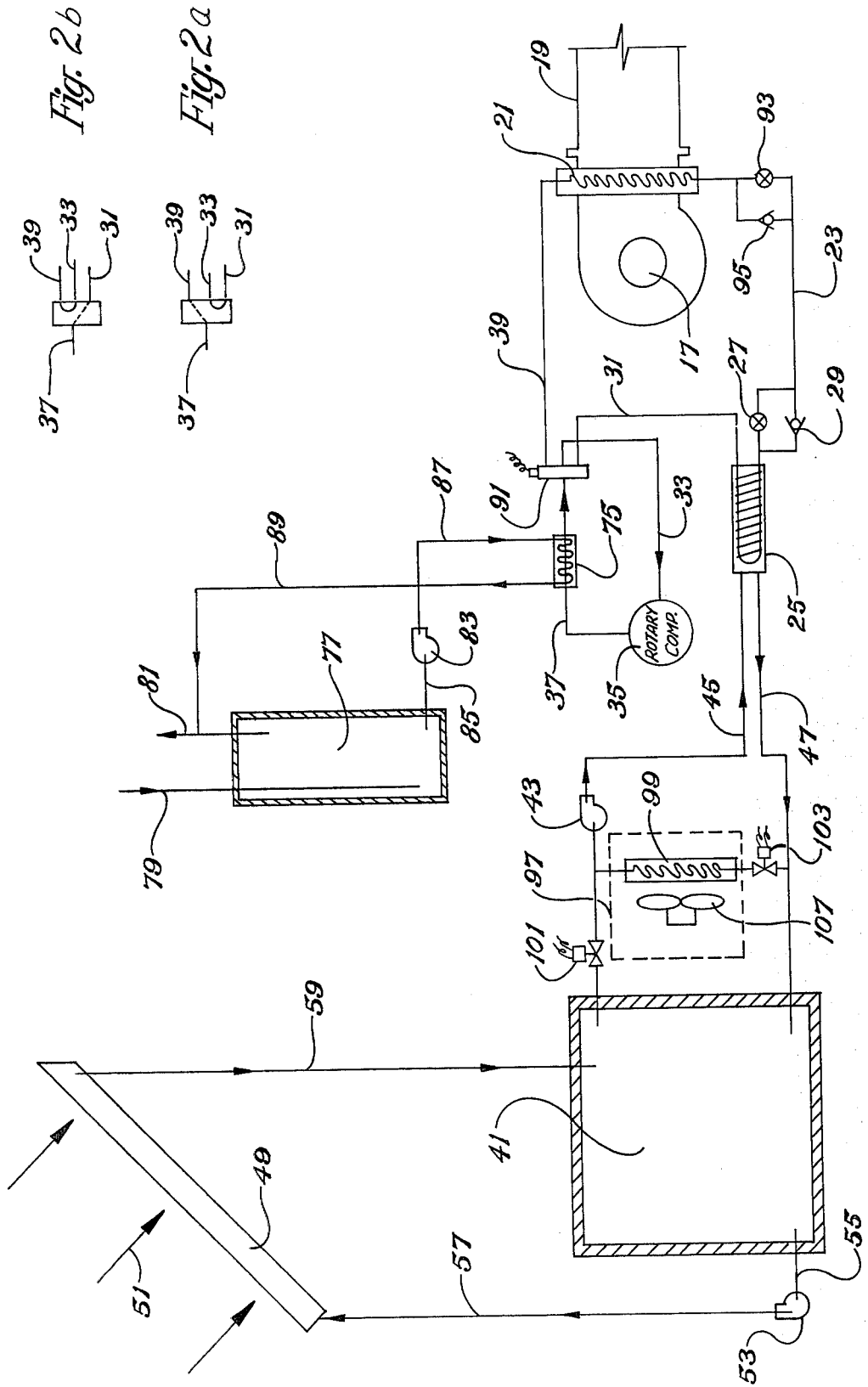

HEAT PUMP EMPLOYING OPTIMAL REFRIGERANT COMPRESSOR FOR LOW PRESSURE RATIO APPLICATIONS

BACKGROUND OF THE INVENTION

1. Field of the Invention

This invention relates to apparatus for conditioning a fluid, such as cooling or heating an enclosed space in which air is circulated in heat exchange relationship with a refrigerant fluid. More particularly, this invention relates to heat pump apparatus for conditioning an enclosed space and employing a combination of a supplemental fluid assist for low pressure ratio of compression of refrigerant and an optimally designed compressor for improved efficiency.

2. Description of the Prior Art

The prior art is replete with a wide variety of types of apparatuses for air conditioning enclosed spaces such as buildings or the like. Heat pumps have been used to pump heat from one location to another. The heat pumps ordinarily had to compress refrigerant gas from a relatively low suction pressure to a relatively high discharge pressure. This is referred to as a high pressure ratio condition; pressure ratio Pr being defined as (discharge pressure/suction pressure). Even the use of heat pumps augmented by solar energy or the like for the purposes of heating or air conditioning building structures or the like has been known. Use was generally limited to certain geographical areas where the average temperature was relatively high. For example, heat pumps were used in Florida or in the Southwestern United States where the energy from the sun was relatively more plentiful than in other areas of the United States. It has generally been conceded heretofore that in temperature and colder climates the use of the heat pump becomes relatively less efficient. In particular, at temperatures below about 20° F. ambient temperature, the heat pump becomes so inefficient with conventional compressor design as to be of questionable utility.

Merely examining United States patents shows a wide variety of attempts to provide solar assisted heat pump systems for heating. Typical of these prior U.S. patent include U.S. Pat. Nos. 1,101,001; 1,130,870; 1,683,434; 2,559,870; 3,178,113; 3,263,493 and U.S. Pat. No. 4,049,407. There is also an article appearing in the Washington Post on Oct. 12, 1974, entitled "Heat Pump A Key To Solar Heating". These systems have employed various approaches to providing supplemental heat, such as burying the evaporator in the earth and putting heat into the earth about the evaporator, the heat coming from a variety of sources such as solar heat exchangers or the like.

A variety of other approaches has been delineated in patents such as the following U.S. Pat. Nos. 2,829,504; 2,847,190; 2,693,939; 2,689,090; 2,584,573; 2,188,811; 3,189,085; 2,970,817; 4,062,489; 4,065,938; and 4,112,920. In these references, the supplemental sources have been provided for defrosting, and deicing the respective heat exchanger when they have frozen up.

In all of these systems, there has been overlooked one basic disadvantage and that is a combination obtaining a high pressure ratio and the inherent lack of efficiency of conventional compressor design. Expressed otherwise, design was compromised for an arbitrary condition that had a high pressure ratio. In particular, the prior art has not analyzed the requirements for compressor design to take advantage of the theoretical benefits of low pressure ratio that can be effected by high evaporator temperatures and high suction pressure in a system or by low condenser temperatures and low discharge pressure in a system.

SUMMARY OF THE INVENTION

Accordingly, it is an object of this invention to provide apparatus for conditioning an enclosed space by pumping heat by means of a refrigerant fluid and exchanging with the air being circulated within the space and employing an improved combination of a low pressure ratio and optimal compressor for taking advantage of the low pressure ratio.

It is another object of this invention to provide a heat pump that is operable in both the heating and cooling mode and having advantages in the heating mode of having elevated evaporator temperatures and an improved compressor design for maximizing the benefits of the higher evaporator temperatures. Furthermore, the similar benefits are derived in the cooling mode if the system operates with low condensing temperatures (lower than that obtainable with air as the heat sink) as with evaporative cooler, ground water or the like.

These and other objects will become apparent from the descriptive matter hereinafter, particularly when taken in conjunction with the appended drawings.

In accordance with this invention, there is provided an apparatus for conditioning a fluid comprising:

a. fluid handler and fluid path means for circulating the fluid in a path in heat exchange relationship with a refrigerant fluid;

b. two refrigerant heat exchangers; one refrigerant-fluid heat exchanger disposed in the path of the fluid such that the fluid is passed in heat exhange therewith; and a second refrigerant-heat exchange fluid heat exchanger for circulating the refrigerant in heat exchange relationship with a heat exchange fluid to affect a low pressure ratio;

c. a rotary compressor for compressing the refrigerant with low power consumption at the low pressure ratio;

d. at least one throttling valve connected at the inlet of a heat exchanger in which liquid refrigerant is being vaporized;

e. a refrigerant circuit serially connecting the two heat exchangers, the throttling valve, and the compressor and defining a flow path for a refrigerant;

f. refrigerant in the refrigerant circuit and adapted to be circulated for transferring heat with respect to the fluid;

g. a source of heat exchange fluid;

h. a heat exchange fluid circulating means for circulating the heat exchange fluid in heat exchange relationship with the refrigerant; and i. heat exchange fluid circuit serially connecting the heat exchange fluid source, circulating means, and refrigerant heat exchanger for circulating the heat exchange fluid in heat exchange relationship with the refrigerant for effecting the low pressure ratio.

In various embodiments, the apparatus is operable in the heating mode with a heated fluid supplying heat to an evaporator and effecting a high suction pressure or in the cooling mode with a cooled fluid taking heat from a condenser and effecting a low discharge pressure.

In a preferred embodiment, the apparatus includes a heat pump that is capable of both heating and cooling and has a reversing valve and respective throttling valves and bypasses around the throttling valves for operating in either the heating or cooling mode. In a still more preferred embodiment, the heated fluid source comprises a solar heated fluid that includes a fluid storage means, solar heat exchanger, heated fluid pump and circuit for circulating the fluid through the solar heat exchanger.

BRIEF DESCRIPTION OF THE DRAWINGS

FIG. 2 is a schematic illustration of a heating apparatus in accordance with one embodiment of this invention.

FIG. 2a is a schematic view of a reversing valve in a heat mode.

FIG. 2b is a schematic view of a reversing valve in a cooling mode.

DESCRIPTION OF PREFERRED EMBODIMENTS

Figure 1:
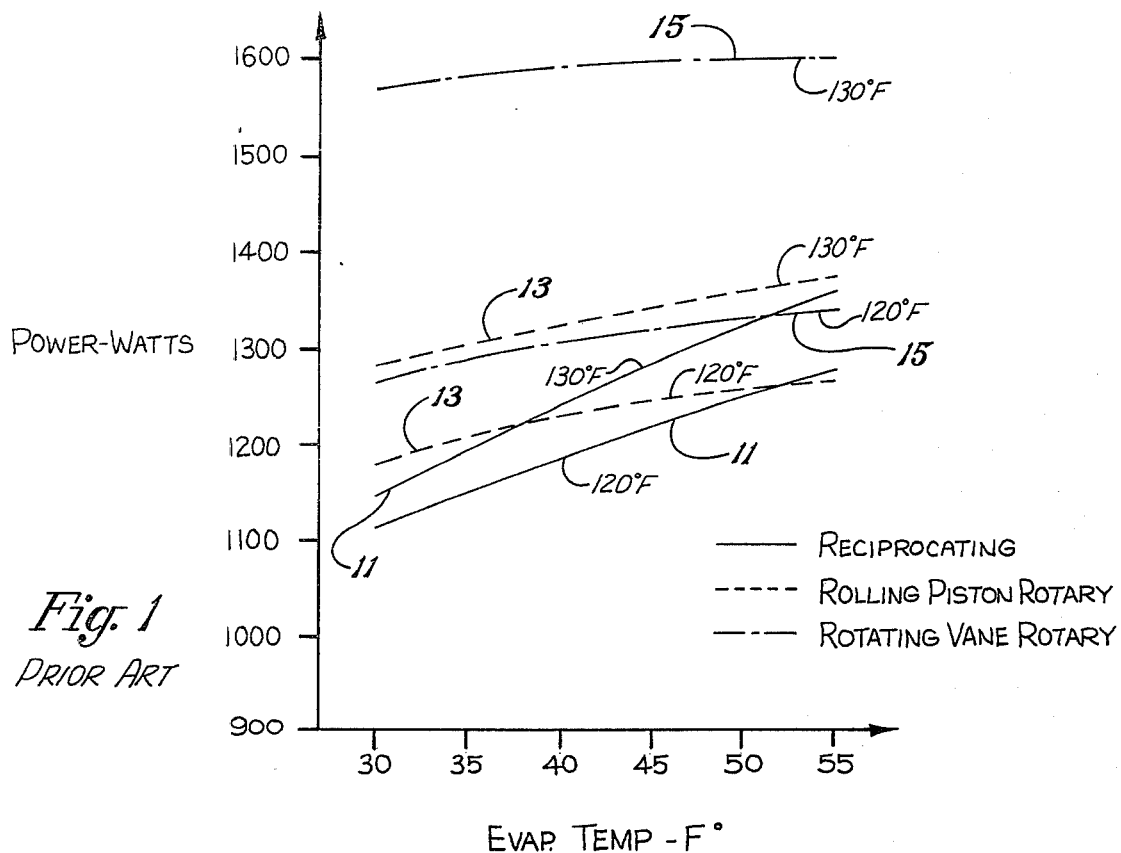
FIG. 1 is a comparative plot of power consumption versus evaporating temperature in accordance with the prior art type of compressor and use.

In the prior art, virtually all of the compressors that have been employed in heat pumps having a heating mode of operation have been reciprocating compressors. The reason can be seen from FIG. 1 which shows the prior art knowledge of compressor performance. Therein the power consumption in watts is plotted for several identical capacity compressors as a function of the condensing temperature for the respective curves against the evaporation temperature plotted along the abscissa, temperatures being in degrees F. Curves 11 are plots for a reciprocating compressor. Curves 13 and 15 are plots for respective rolling piston type and rotating vane type rotary compressors. The condensing temperatures for curves 11, 13 and 15 was 120° and 130° F. As can be seen, the curves 11 for a reciprocating compressor has substantially lower power consumption than do the rotary compressors shown by curves 13 and 15 where an evaporator temperature of less than about 30° was encountered; as was the usual case in winter operation when a heat pump was needed for heating. The rotary compressors are only employed in refrigeration cycles where quiet operation was imperative; for example, in the household refrigerator or the like.

This invention, however, stemmed from a re-thinking of the basic considerations and extending the range of known performance data in the light of the current energy crisis. This invention can be understood more clearly by referring to FIG. 2. Therein, an air handler and air path means for circulating the air comprises an air blower 17 that is connected with a plenum 19. The air blower 17 may comprise any of the conventional air handlers such as the so called "squirrel cage" blowers that are powered, directly or by suitable intermediate links, with an electric motor or the like. These blowers and motors are powered for circulating the requisite quantity of air throughout the enclosed space to be air conditioned; for example building or the like.

The plenum 19 may comprise any of the prior art types of plenums. As illustrated, it is a sheet metal major duct with tributary ducts branching off it (the latter not being illustrated). The return to the suction side of the air blower 17 may be by separate ducts or by way of the building structure and suitable louvered inlet to the suction side of the air blower 17. With this technique, the air is able to be passed in heat exchange relationship with a refrigerant fluid.

A first refrigerant-air exchanger 21 is disposed on the discharge side of the air blower 17 such that the air is passed in heat exchange relationship with the refrigerant fluid that is passed interiorly through the coils of the exchanger 21. The first refrigerant-air heat exchanger 21 serves as an evaporator when the heat pump is being operated in the cooling mode and serves as a condenser when the heat pump is being operated in the heating mode. While the construction of the first heat exchanger may take any of the suitable forms, it is preferable to employ conventional finned copper tube heat exchanger for highly efficient heat transfer regardless of whether the air is being heated or cooled.

The first refrigerant-air heat exchanger 21 has its discharge side connected by tubing 23 with a second refrigerant-heated fluid heat exchanger 25 for circulating the refrigerant in heat exchange relationship with a nonambiently heated fluid to effect high evaporator temperatures. Specifically, at the heating inlet to the evaporator, there is provided a throttling valve 27 that is connected in parallel with a check valve 29 such that the check valve blocks the flow from tubing 23 into the second heat exchanger 25 and allows the throttling valve to throttle flow thereinto. As would be appreciated, the hot compressed refrigerant gas is cooled in the first heat exchanger 21 by blowing air there past until the gaseous refrigerant is liquefied. The liquid is then flashed past the throttling valve into the second heat exchanger 25, which operates as an evaporator in the heating mode. The second heat exchanger 25 may comprise any of the conventional type heat exchangers in which two fluids are passed in heat exchanger relationship. Preferably, in the illustrated embodiment, the second heat exchanger 25 is designed to pass the refrigerant fluid in heat exchange relationship with a heated liquid and may comprise high flux coils of copper tubing, concentric tubing structure, or the like for that purpose.

In any event, the discharge side of the second refrigerant-heated fluid heat exchanger on the refrigerant side, is connected by way of tubing 31, 33 with the suction side of a rotary compressor (comp) 35.

The rotary compressor 35 may take the form of any of the conventional rotary compressors including the rotary vane type compressors, the rolling piston rotary compressors or the like as long as they are designed to handle the pressure ratio with low power consumption when high evaporator temperatures are employed. Specifically, in the prior art, compression ratios were frequently in the range of 6 to 7 where the evaporator temperature would be in the order of 0° F., equivalent to about 25 pounds per square inch gauge (psig) and the condenser temperatures were in the order of 120° F., equivalent to about 260 psig. These types of compression ratios required reciprocating compressions for efficient operation. In accordance with this invention, however, higher evaporator temperatures on the order of 60° to 90° make possible suction side pressures from about a 100 to 168 psig so as to lower the compression ratio significantly with attendant power reductions where the compressors are designed to work efficiently at these lower pressure ratios. Such rotary compressors are commercially available, although they may have been designed for other markets and optimized at higher pressure ratio conditions.

In any event, the discharge side of the rotary compressor 35 is connected by tubing 37, 39 with the inlet side of the first air-refrigerant heat exchanger 21. This completes a refrigerant circuit for heating mode operation and allows efficient transfer of heat from a heated fluid source into the air being circulated within the space to be heated.

The heated fluid side of the second refrigerant-heated fluid heat exchanger 25 is connected into a heated fluid circuit that includes a source of heated fluid 41 in the form of a storage tank; a heated fluid circulating means in the form of pump 43 and inlet and outlet conduits, respectively, 45, 47.

The storage tank 41 holds a heat exchange liquid such as water although an aqueous solution containing antifreeze like ethylene glycol, diethylene glycol, or triethylene glycol or propylene glycol could be used. Generally, the fluid in the collectors will be an anti-freeze solution and the storage fluid will be water. An additional heat exchanger and pump is required to transfer heat from the collector fluid into the storage medium in such a case. Ordinarily, the temperature of the liquid in the storage tank will be in the range of 35°–140° F. depending on the heating source availability.

As a heating source in the illustrated embodiment, one or more solar collectors 49 are employed to receive the sun's rays, shown by arrow 51, to heat the fluid being circulated through the solar heat exchanger, or solar collector, 49. A pump 53 has its suction side connected with the interior of storage tank 41 by way of conduit 55 and has its discharge connected with the inlet to the solar collector 49 by way of conduit 57. A return conduit 59 connects discharge side of the solar collector 49 with the interior of the storage tank 41. Thus, when the solar collectors are very efficient, high temperature water can be stored in the tank 41 for raising evaporator temperatures.

While solar collectors are shown as the source of heat for heating the fluid above ambient temperatures, any of the other sources of heat can be employed. Such other sources of heat may be at such a low potential that they are frequently neglected as being infeasible for commercial purposes. For example, stack gases can be employed to heat the heated fluid; geothermal fluids can be employed if they are available; low pressure waste steam may be condensed to supply heat.

In operation in the heating mode, the liquid refrigerant is vaporized at relatively high evaporator temperatures in the second exchanger 25. The refrigerant gas at relatively high suction pressure is then compressed efficiently by the rotary compressor 35 and discharges by line 39 as a hot compressed refrigerant.

The refrigerant that is employed is not critical and may comprise any of the comercially available materials suitable for the normal operating conditions. Ordinarily, the refrigerants that are employed in the modern commercial community are the polyhalogenated hydrocarbons. Typical of the refrigerants are R-12, dichlorodifluoromethane; R-22, monochlorodifluoromethane; or R-502. Other refrigerants are readily available to serve as required in any particular locale. Herein, the equating of evaporator temperatures and pressures on the suction side of the rotary compressor 35 employ vapor pressure curves for refrigerant R-22.

In any event, the hot compressed refrigerant gas is then fed to the first refrigerant-air heat exchanger 21 where the air is being blown past by the air blower 17. As a consequence, heat is removed from the refrigerant and the air is heated to heat the space in which it is being circulated through plenum 19. As a consequence of the removal of the heat from the hot compressed refrigerant gas, it is cooled and ultimately liquified. The liquid is then passed through tubing 23 to the throttling valve 27, where it is allowed to throttle into the second heat exchanger 25, serving as an evaporator in the heating mode.

The heated fluid, such as the nonpotable/water in storage tank 41, is circulated by pump 43 through the water side of the evaporator 25. As a consequence, the heat is transferred from the heated fluid into the refrigerant to vaporize it to be again passed through the rotary compressor 35 and repeat the cycle.

Figure 3:
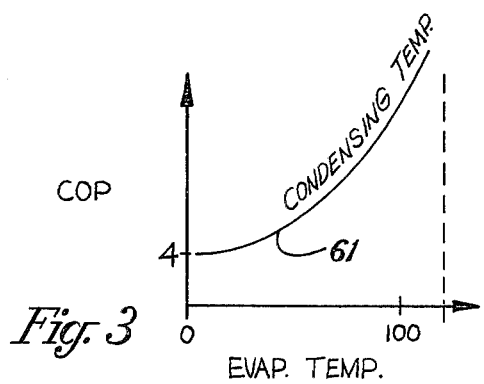
FIG. 3 is a plot of the coefficient of performance versus evaporating temperature based on theoretical capabilities.
Figure 4:
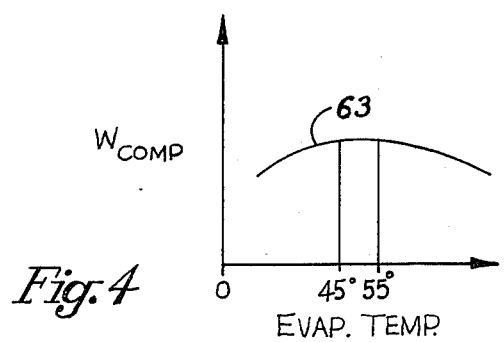
FIG. 4 is a plot of the work of compression versus evaporating temperature based on theoretical performance.
Figure 5:
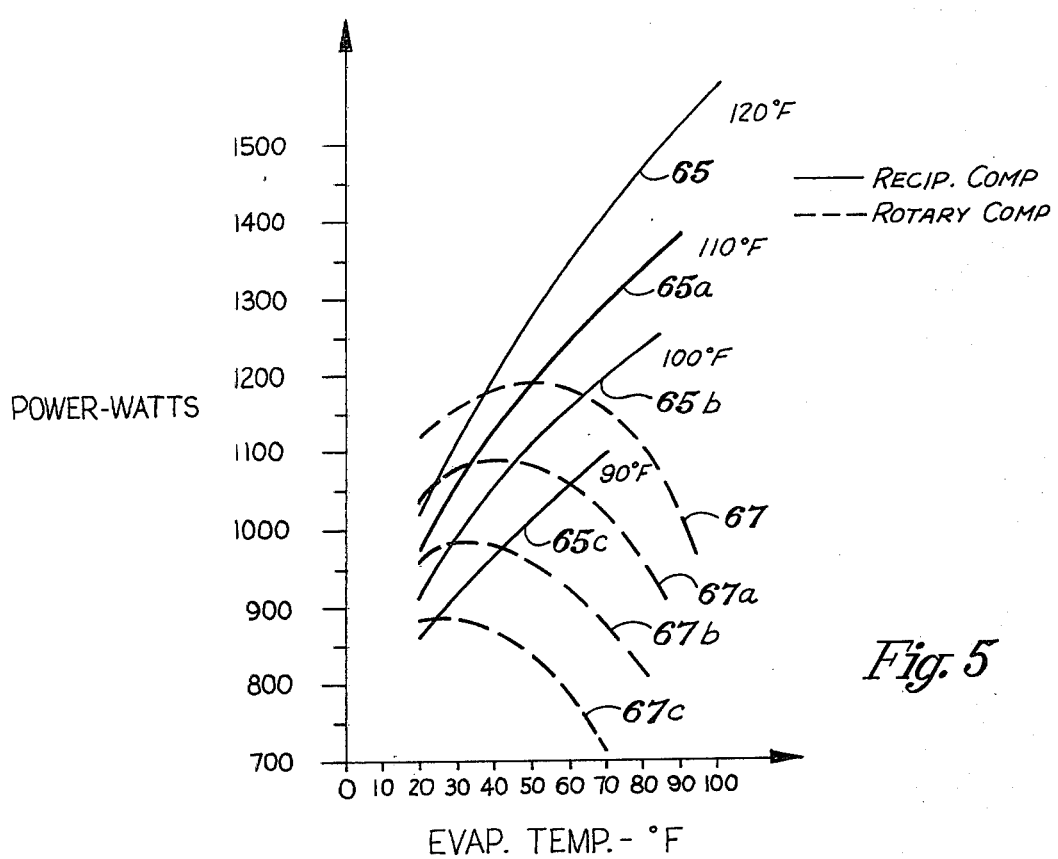
FIG. 5 is an extended plot of the power consumption of the various compressors versus evaporator temperature at higher evaporating temperatures based on laboratory performance testing.

The heated fluid in the storage 41 is maintained in a heated condition by the supplemental heat source, such as the solar collectors 49 during periods of solar insolation. Specifically, the temperature in the solar collector is sensed by a suitable sensor (not shown) and when above the temperature in the storage tank 41 the pump 53 circulates the water as long as heat is added to the fluid. Once the heat of the water being circulated is greater than the temperature in the solar collector 49, the pump is stopped and the temperature allowed to increase in the solar collector to again impart heat. To fully understand the degree of unobviousness of this invention, it is helpful to examine the basic theoretical considerations to see why it was necessary to alter the direction that commercialization was taking. It will be recalled from the prior discussion of the prior art of FIG. 1 that the reciprocating compressors had lower power consumption than rotary compressors at the high pressure ratio conditions of the prior and, hence, were employed. With this invention, however, FIG. 3 shows a plot of the coefficient of performance COP (where COP is defined as the delivered capacity divided by the work energy input) as a function of the condensing temperature, curve 61, plotted against the evaporator (evap.) temperature as the abscissa. Thus it theoretically should be possible to achieve very high coefficient of performance numbers as high as 20 or more as the evaporator temperature approaches the condenser temperature. FIG. 4 illustrates via curve 63 that the compressor input power $W_{comp}$, as plotted against evaporating temperature, should begin to decrease again as the eavporating temperature increases beyond about b 45° to 55° F. for a constant condensing temperature. In point of fact, however, when the conventional reciprocating compressors were employed, the curve 65, FIG. 5, demonstrates how power consumption continues to increase at temperature above about 45° evaporating temperature and the condensing temperature of 120° F. Expressed otherwise, the conventional compressors that were employed in the prior art heat pumps did not have the capability of taking advantage of the performance advantages of high evaporator temperatures, since they were designed for winter operation with low evaporator temperatures as well as cooling at high loads. The set of curves 65 and 65a-c are respective plots of a conventional high efficiency reciprocating compressor as a function of evaporating temperature on the abccissa. The power continues to increase such that it is impossible to realize the theoretical decrease in work of compression for high evaporator temperatures. In curves 67 and 67a-c, however, it can be seen that a typical rotary compressor allows achieving the decreased power consumption with higher evaporator temperatures.

Figure 6:
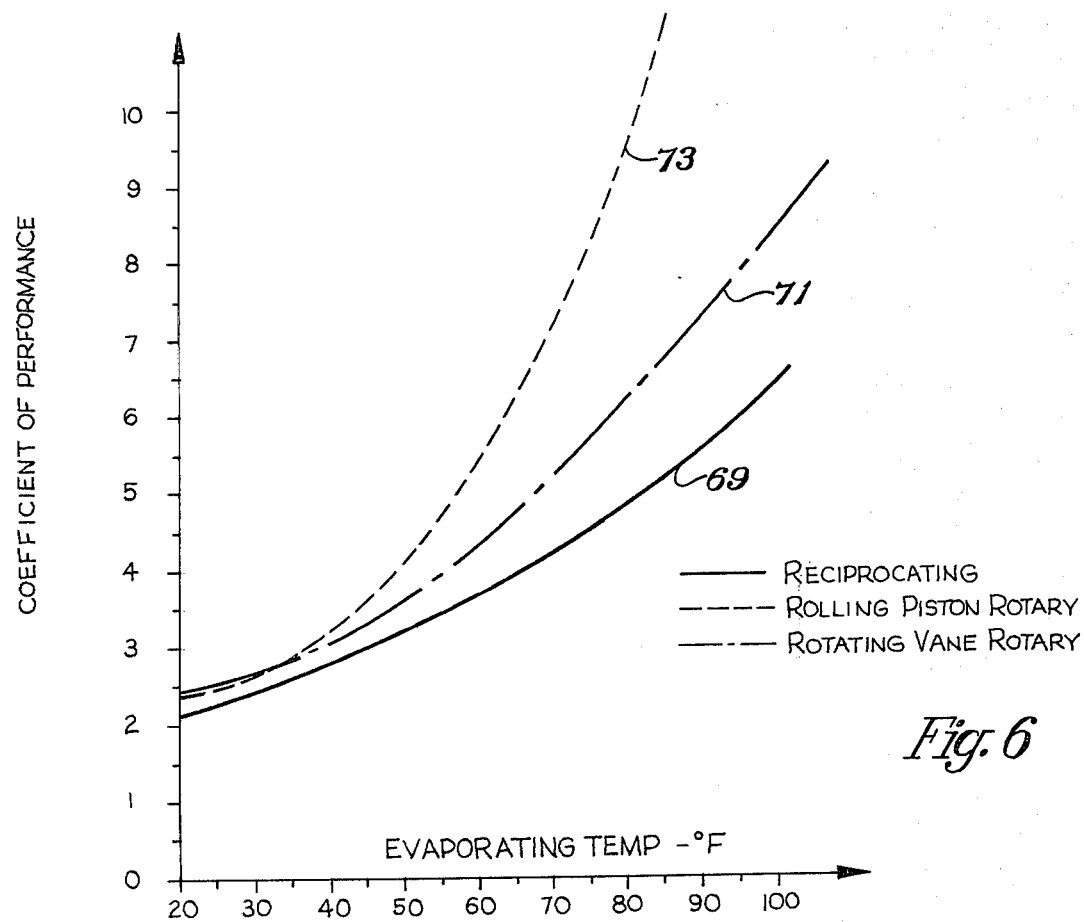
FIG. 6 is a plot of the coefficient performance versus the evaporating temperature over an extended range based on laboratory performance testing.

FIG. 6 is a plot of the coefficient of performance for three types of compressors. The curve 69 shows a high efficiency reciprocating compressor; whereas the curves 71 and 73 are plots of the coefficients for, respectively a rotary vane rotary compressor and a rolling piston rotary compressor. Thus it can be seen that with evaporator temperatures as high as about 75° F., the coefficient of performance for a rolling piston rotary compressor is, surprisingly, about twice the coefficient of performance of a conventional reciprocating compressor.

Heretofore, compressors in heat pumps operated at a pressure ratio of about 3.5 or higher. Lower operating power consumption is possible in accordance with this invention with a low pressure ratio below 3.0 and an appropriately designed compressor to take advantage of the theoretical savings. Implicit in the foregoing description of operating in the heating mode is the realization of low pressure ratio through high suction pressure with high evaporator temperatures. Conversely, a low pressure ratio can be achieved in the cooling mode through low discharge pressure with low condenser temperatures.

In cooling operation, the compressed refrigerant gas is passed in heat exchange relationship with a nonambiently cooled fluid to condense the refrigerant at a low discharge pressure. The cooled fluid may be ground water or fluid that has been cooled by another means to a temperature below the atmospheric temperature.

The liquefied refrigerant is then passed to the evaporator where it absorbs heat from the fluid to be cooled; for example, air being circulated to a building. Consequently, the refrigerant is vaporized in the evaporator and passes to the rotary compressor. The cycle is repeated.

In the illustrated embodiment of FIG. 2, there is provided a desuperheater 75 adjacent the discharge of rotary compressor 35 to remove the superheat of compression. The desuperheater is a heat exchanger in which the hot refrigerant gas is passed interiorly of the coils on one side and a fluid such as hot water is passed on the other side.

Specifically, the hot water storage tank 77 is provided for storing the water and has the usual incoming potable water line 79 and the hot water discharge line 81. Specifically, a pump 83 has its suction connected with the storage tank 77 via conduit 85 and has its discharge side connected with desuperheater 75 via conduit 87. The return from the desuperheater heat exchanger 75 is connected with the hot line 81 via conduit 89. As will be clear, if water is not being used out the hot water line 81, the water flows interiorly of storage tank 77 replacing that pumped by pump 83 to increase the temperature of the water in the storage tank. Of course, suitable safety controls can be employed to prevent developing too high a temperature or pressure in the storage tank.

The hot water storage tank coupled with a desuperheater adds a significant economic incentive to the use of the system.

Figure 7:
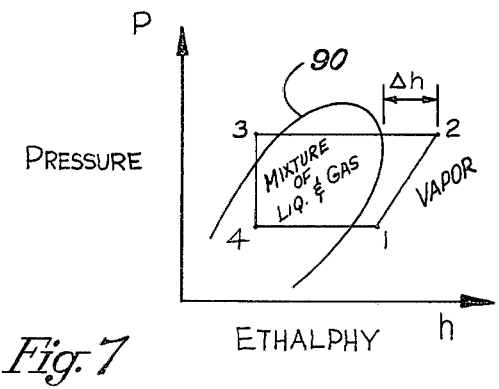
FIG. 7 is a plot of the pressure versus enthalpy of one embodiment of this invention.
Figure 8:
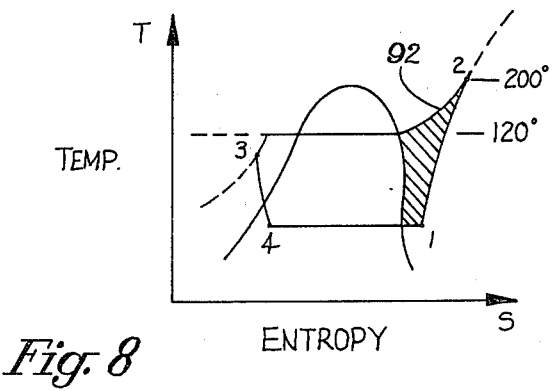
FIG. 8 is a plot of the temperature versus entropy for one embodiment of this invention.

FIG. 7 is pressure enthalpy plot and shows the energy available for desuperheater as $\Delta h$. This is shown more graphically in FIG. 8 which is a temperature-entropy plot. Therein, the heat, shown by the shaded area 92, is available to heat water at no cost. The cylce and paths between respective state points given numbers, 1, 2, 3 and 4 in FIGS. 7 and 8 represent, respectively, the compression (path 1-2), the condensing at constant pressure (path 2-3), the flashing past the throttling valve (path 3-4) and the passing through the evaporator to get back to point 1. In FIG. 7, between point 2 and 3, heat is given up; whereas between points 4 and 1 heat is accepted by the refrigerant.

In operation, the water is circulated through the desuperheater only when the compressor 35 is running. Consequently, the pump 83 is turned on with the same control switch that turns on compressor 35. If desired, of course, an additional control; such as, a temperature sensor in the domestic hot water storage tank 77 could be employed to turn on the pump 83 only when the maximum water storage temperature has not been exceeded.

Referring to FIG. 2, the illustrated embodiment has the capability of operating in the cooling mode also. Expressed otherwise, the apparatus includes a reversing valve 91 and second throttling valve 93 disposed at the cooling inlet to the first heat exchanger 21.

The reversing valve 91 is simply a solenoid operated valve in which a plunger directs the refrigerant to one of two paths depending upon whether it is in the cooling or heating mode. As illustrated in FIG. 2b, the refrigerant may flow from line 37 to line 31 in the cooling mode and the line 33 is connected with the line 39. On the other hand, shown by FIG. 2a, in the heating mode, the line 37 is connected with the line 39 to send the hot refrigerant to the first heat exchanger 21 instead of second heat exchanger 25 as in the cooling mode. Conversely, the line 33 is connected with the line 31 in the heating mode.

The throttling valve 93 is connected with first heat exchanger 21 similarly as throttling valve 27 is connected with the second heat exchanger 25 and similarly as described hereinbefore has a bypass check valve 95 connected in parallel with it. If desired, a single bi-directional throttling valve can be used in lieu of check valves 29 and 95 and throttling valves 27 and 93.

An outdoor heat rejection unit 97 is connected in parallel with the storage tank 41 of the heated fluid circulation unit. The purpose of the unit 97 is to reject heat picked up from the hot refrigerant gases in the second heat exchanger 25 if that heat is not to be stored in the fluid in the storage tank 41. Specifically, an air-fluid heat exchanger 99 is connected in parallel with the storage tank 41 by way of valves 101 and 103 that can be operated electrically to switch operation to the outdoor heat rejection unit. A fan 107 is provided for circulating air past the fluid heat exchanger to take heat away when the unit is being operated in the cooling mode and it is not desired to store heat in the storage tank 41.

Since the operation has been explained hereinbefore with respect to the heating mode operation, only operation in the cooling mode will be explained.

In operation in the cooling mode, the rotary compressor 35 compresses the refrigerant gases. The excess heat is taken out by a desuperheater 75. The reversing valve 91 is operated into position illustrated in FIG. 2b to send the gases via line 31 to the second heat exchanger 25. There the heat is picked up by the fluid being circulated by pump 43 through lines 45 and 47. The heat is rejected in the air heat exchanger 99. In the other side of the heat exchanger 25, the refrigerant is condensed and passes by check valve 29 to the throttle valve 93 at the inlet of the first heat exchanger 21. The check valve 95 closes and forces the liquid refrigerant to go through the throttle valve 93. The air being moved by the blower 17 passes the first heat exchanger 21. The heat given up by the air in being cooled vaporizes the liquid refrigerant and the refrigerant vapors pass by line 39 and reversing valve 91 to the suction side, or line 33, of rotary compressor 35 to repeat the cycle.

From the foregoing it can be seen that this invention provides unobvious and useful significant economies to be realized in the operation of the heat pump in both the heating and cooling modes when nonambiently heated or cooled fluids are respectively available. The invention stems from rethinking the basic parameters of the process and going in a direction opposite that taken by the prior art. It can be seen that the object delineated hereinbefore have been achieved by this invention.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

What is claimed is:

1. An apparatus for heating a fluid comprising:
   a. fluid handler and fluid path means for circulating said fluid in a path in heat exchange relationship with a refrigerant fluid;
   b. a first refrigerant-fluid heat exchanger disposed in said path of said fluid such that said fluid is passed in heat exchange therewith;
   c. a second refrigerant-heated fluid heat exchanger for circulating said refrigerant in heat exchange relationship with a nonambiently heated fluid to effect high evaporator temperatures and resulting high suction pressure;
   d. a rotary compressor having a single suction pressure intake location for efficiently compressing said refrigerant with low power consumption at said high evaporator temperatures and resultant low pressure ratio;
   e. at least one throttling valve connected at the heating inlet side of said second heat exchanger;
   f. a refrigerant circuit serially connecting said first heat exchanger, throttling valve, second heat exchanger, and compressor and defining a flow path for said refrigerant;
   g. refrigerant disposed in said refrigerant circuit and adapted to be circulated for transferring heat with respect to said fluid;
   h. a source of heated fluid heated to a temperature greater than ambient;
   i. heated fluid circulating means for circulating said heated fluid in heat exchange relationship with said refrigerant in said second heat exchanger;
   j. heated fluid circuit serially connecting said heated fluid source, circulating means and said second heat exchanger for providing said elevated evaporator temperatures for heating.

2. The apparatus of claim 1 wherein fluid is air, said fluid handler and fluid path means comprise an air handler and air path means, said air is circulated within an enclosed space such as a building for heating the enclosed space.

3. The apparatus of claim 1 wherein said heated fluid source comprises a solar heated fluid and includes a heated fluid storage means for storing said heated fluid, a solar heat exchanger for heating said fluid, a second heated fluid circulating means and circuit means for circulating said fluid through said solar heat exchanger; said circuit means serially connecting said storage means, circulating means and solar heat exchanger.

4. The apparatus of claim 1 wherein said apparatus is a heat pump that is operable also in a cooling mode, said refrigerant circuit also includes a reversing valve for reversing the flow of hot refrigerant gases with regard to said first and second heat exchanger, and a second throttling valve is provided at the cooling entrance to said first heat exchanger; and respective uni-directional bypass means are connected in parallel with respective said throttling valves for allowing respective directions of flow opposite directions of flow through said throttling valve.

5. The apparatus of claim 4 wherein said heated fluid source comprises a solar heated fluid and includes a heated fluid storage means for storing said heated fluid, a solar heat exchanger for heating said fluid, a second heated fluid circulating means and circuit means for circulating said fluid through said solar heat exchanger; said circuit means serially connecting said storage means, circulating means and solar heat exchanger; and said heated fluid circuit includes an outdoor heat rejection heat exchanger connected in parallel with said source and in series with said heated fluid circulating means for rejecting heat to ambient.

6. The apparatus of claim 4 wherein there is provided a desuperheater heat exchanger connected in series with the discharge side of said compressor for removing superheat from said refrigerant, a hot water storage tank, a hot water pump, a hot water circuit serially connecting said hot water storage tank, pump and desuperheater heat exchanger on the water side for using said superheat of compressed said refrigerant.

7. The apparatus of claim 4 wherein said heated fluid comprises a fluid from subterranean formations.

8. The apparatus of claim 4 wherein said heated fluid comprises a fluid that is heated by waste heat from stack flue gases.

9. The apparatus of claim 1 wherein said rotary compressor is a rolling piston, stationary vane type compressor.

10. The apparatus of claim 1 wherein said rotary compressor is a rotary, sliding vane type compressor.

11. The apparatus of claim 1 wherein said compressor has its single suction pressure intake location adapted to intake refrigerant gas at a predetermined pressure for a predetermined application.

12. The apparatus of claim 1 wherein said heated fluid comprises a fluid utilizing heat from a subterranean formation.

13. An apparatus for cooling a fluid comprising:

a. fluid handler and fluid path means for circulating said fluid in a path in heat exchange relationship with a refrigerant fluid;
b. a refrigerant-fluid heat exchanger disposed in said path of said fluid such that said fluid is passed in heat exchange therewith;
c. a refrigerant-cooled fluid heat exchanger for circulating said refrigerant in heat exchange relationship with a nonambiently cooled fluid to effect low condenser temperatures and resulting low discharge pressure;
d. a rotary compressor having single suction pressure intake location for efficiently compressing said refrigerant with low power consumption at said low condenser temperatures and resulting low pressure ratio;
e. at least one throttling valve connected at the inlet side of said refrigerant-fluid heat exchanger;
f. a refrigerant circuit serially connecting said refrigerant-cooled fluid heat exchanger, throttling valve, refrigerant-fluid heat exchanger, and compressor and defining a flow path for said refrigerant;
g. refrigerant disposed in said refrigerant circuit and adapted to be circulated for transferring heat with respect to said fluid;
h. a source of cooled fluid cooled to a temperature below ambient;
i. cooled fluid circulating means for circulating said cooled fluid in heat exchange relationship with said refrigerant in said refrigerant-cooled fluid heat exchanger;
j. cooled fluid circuit serially connecting said cooled fluid source, circulating means and said refrigerant-cooled fluid heat exchanger for providing said low condenser temperatures for cooling.

14. The apparatus of claim 13 wherein said rotary compressor is a rolling piston, stationary vane type compressor.

15. The apparatus of claim 13 wherein said rotary compressor is a rotary, sliding vane type compressor.

16. The apparatus of claim 13 wherein said compressor has its single suction pressure intake location adapted to intake refrigerant gas at a predetermined pressure for a predetermined application.

17. The apparatus of claim 13 wherein said cooled fluid comprises a fluid that has been cooled below ambient by exchanging heat with a subterranean formation.

18. An apparatus for conditioning a fluid temperature-wise, comprising:
a. fluid handler and fluid path means for circulating said fluid in a path in heat exchange relationship with a refrigerant fluid;
b. two refrigerant heat exchangers; one refrigerant-fluid heat exchanger disposed in said path of said fluid such that said fluid is passed in heat exchange therewith; and a second refrigerant-heat exchange fluid heat exchanger for circulating said refrigerant in heat exchange relationship with a heat exchange fluid to effect a low pressure ratio below 3;
c. a rotary compressor having a single suction pressure intake location for efficiently compressing said refrigerant with low power consumption at said low pressure ratio;
d. at least one throttling valve connected at the inlet of a heat exchanger in which liquid refrigerant is being vaporized;
e. a refrigerant circuit serially connecting said two heat exchangers, throttling valves, and compressor and defining a flow path for said refrigerant;
f. refrigerant disposed in said refrigerant circuit and adapted to be circulated for transferring heat with respect to said fluid;
g. a source of heat exchange fluid;
h. heat exchange fluid circulating means for circulating said heat exchange fluid in heat exchange relationship with said refrigerant; and
i. heat exchange fluid circuit serially connecting said heat exchange fluid source, circulating means and refrigerant heat exchanger for providing said low pressure ratio.

19. The apparatus of claim 18 wherein said rotary compressor is a rolling piston, stationary vane type compressor.

20. The apparatus of claim 18 wherein said rotary compressor is a rotary, sliding vane type compressor.

21. The apparatus of claim 18 wherein said compressor has its single suction pressure intake location adapted to intake refrigerant gas at a predetermined pressure for a predetermined application.

22. The apparatus of claim 18 wherein said heat exchange fluid comprises a fluid that has exchanged heat with subterranean formation so as to have its temperature adjusted to effect said low pressure ratio below 3 when flowed in heat exchange relationship with said refrigerant.

* * * * *